US012649529B2

(12) United States Patent
Favaretto

(10) Patent No.: US 12,649,529 B2
(45) Date of Patent: Jun. 9, 2026

(54) CAR WITH ENGINE MOUNTED ON MOVABLE FLOOR PORTION

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 357 days.

(21) Appl. No.: 18/462,924

(22) Filed: Sep. 7, 2023

(65) Prior Publication Data

US 2024/0083522 A1      Mar. 14, 2024

(30) Foreign Application Priority Data

Sep. 12, 2022      (IT) ........................ 102022000018468

(51) Int. Cl.
B62D 35/02 (2006.01)
B60K 5/12 (2006.01)

(52) U.S. Cl.
CPC ............ B62D 35/02 (2013.01); B60K 5/1208 (2013.01)

(58) Field of Classification Search
CPC ...... B60K 5/1208; B62D 21/11; B62D 35/02; B62D 25/082; B62D 25/24
See application file for complete search history.

(56) References Cited

U.S. PATENT DOCUMENTS

| | | | |
|---|---|---|---|
| 2004/0200356 A1* | 10/2004 | Kuperus | .............. B60K 15/063 |
| | | | 96/147 |
| 2013/0181476 A1 | 7/2013 | Naoi | |
| 2017/0174272 A1 | 6/2017 | Yonezawa et al. | |
| 2019/0308672 A1* | 10/2019 | Schounard | ........... B62D 21/183 |
| 2020/0086731 A1* | 3/2020 | Yohannes | ............. F16H 57/025 |
| 2020/0102020 A1 | 4/2020 | Fujisawa | |
| 2020/0130612 A1* | 4/2020 | Seegert | ............... B60R 13/0838 |

FOREIGN PATENT DOCUMENTS

DE      10346319 A1 *  4/2005   ............. B60K 17/00

OTHER PUBLICATIONS

Italian Search Report for Application No. 102022000018468, Filing Date: Sep. 12, 2022; Date of Mailing: Apr. 23, 2023, 6 pages.

* cited by examiner

*Primary Examiner* — Daniel J Colilla
(74) *Attorney, Agent, or Firm* — CANTOR COLBURN LLP

(57) ABSTRACT

A car is provided with a support frame defining part of a lower floor of the car, with a passenger compartment projecting upwards from the lower floor, with a driving engine to move the car, and with an aerodynamic bottom, which is at least partly fixed to the support frame, defines part of the lower floor and has a fixed portion locked on the support frame and a movable portion locked on the driving engine and movable relative to the fixed portion.

8 Claims, 6 Drawing Sheets

CAR WITH ENGINE MOUNTED ON MOVABLE FLOOR PORTION

CROSS-REFERENCE TO RELATED APPLICATIONS

This patent application claims priority from Italian patent application no. 102022000018468 filed on Sep. 12, 2022, the entire disclosure of which is incorporated herein by reference.

TECHNICAL FIELD

The invention relates to a car.

In particular, the invention relates to a car of the kind comprising a support frame defining part of a lower floor of the car; a passenger compartment mounted on the support frame and projecting upwards from the lower floor; a driving engine to move the car; and an aerodynamic bottom fixed to the support frame and defining part of the lower floor.

BACKGROUND

The driving engine is mounted in a central rear area of the car and is fixed to the support frame through the interposition of an elastic shock absorber device, which allows the driving engine to move relative to the lower floor during the normal operation of the car.

In order to allow the driving engine to move relative to the lower floor, the driving engine is fixed to the support frame at a given distance from the lower floor itself.

Known cars of the kind described above suffer from some drawbacks, which are mainly due to the fact that the distance between the driving engine and the lower floor leads to a relatively high centre of gravity of the car and, hence, jeopardizes the aerodynamics of the car.

SUMMARY

The object of the invention is to provide a car designed to eliminate the aforementioned drawbacks in a straightforward, relatively low-cost manner.

According to the invention, there is provided a car as claimed in the appended claims.

BRIEF DESCRIPTION OF THE DRAWINGS

The invention will now be described with reference to the accompanying drawings showing a non-limiting embodiment thereof, wherein.

DESCRIPTION OF EMBODIMENTS

Figure 1:
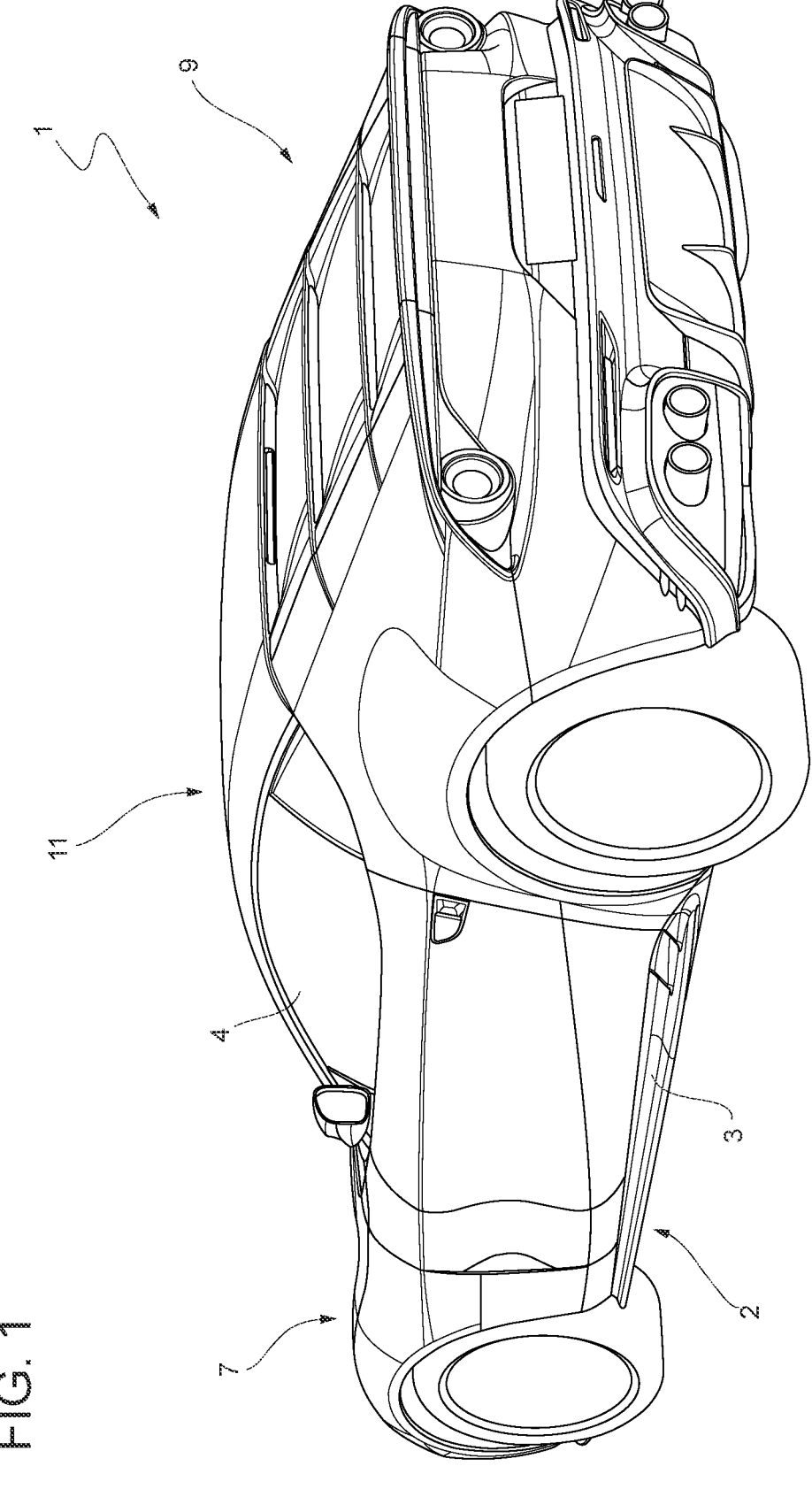
FIG. 1 is a schematic perspective view, with parts removed for greater clarity, of a preferred embodiment of the car according to the invention.
Figure 2:
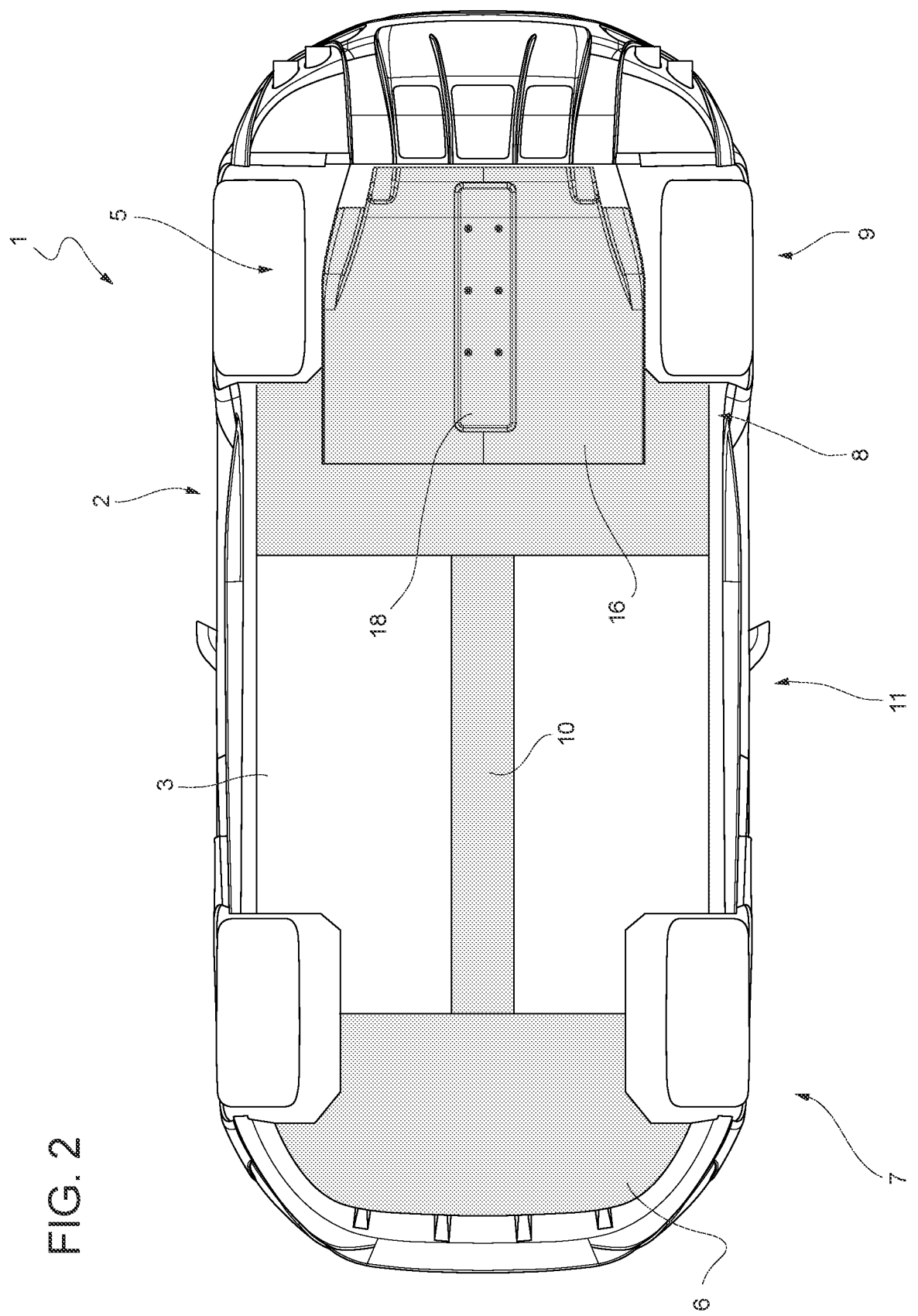
FIG. 2 is a schematic bottom view, with parts removed for greater clarity, of the car of FIG. 1.

With reference to FIGS. 1 and 2, number 1 indicates, as a whole, a car, in particular a sports car, comprising a support frame 2 defining part of a lower floor 3 of the car 1.

The car 1 further comprises a passenger compartment 4, which is mounted on the frame 2 and projects upwards from the floor 3, and an aerodynamic bottom 5, which is partly fixed to the frame 2 and defines part of the floor 3.

The bottom 5 comprises a front bottom 6, which is fixed to the frame 2 in a front area 7 of the car 1, a rear bottom 8, which is mounted in a rear area 9 of the car 1, and an elongated central bottom 10, which is fixed to the frame 2 between the bottoms 6 and 8 and in a central area 11 of the car 1.

Figure 3:
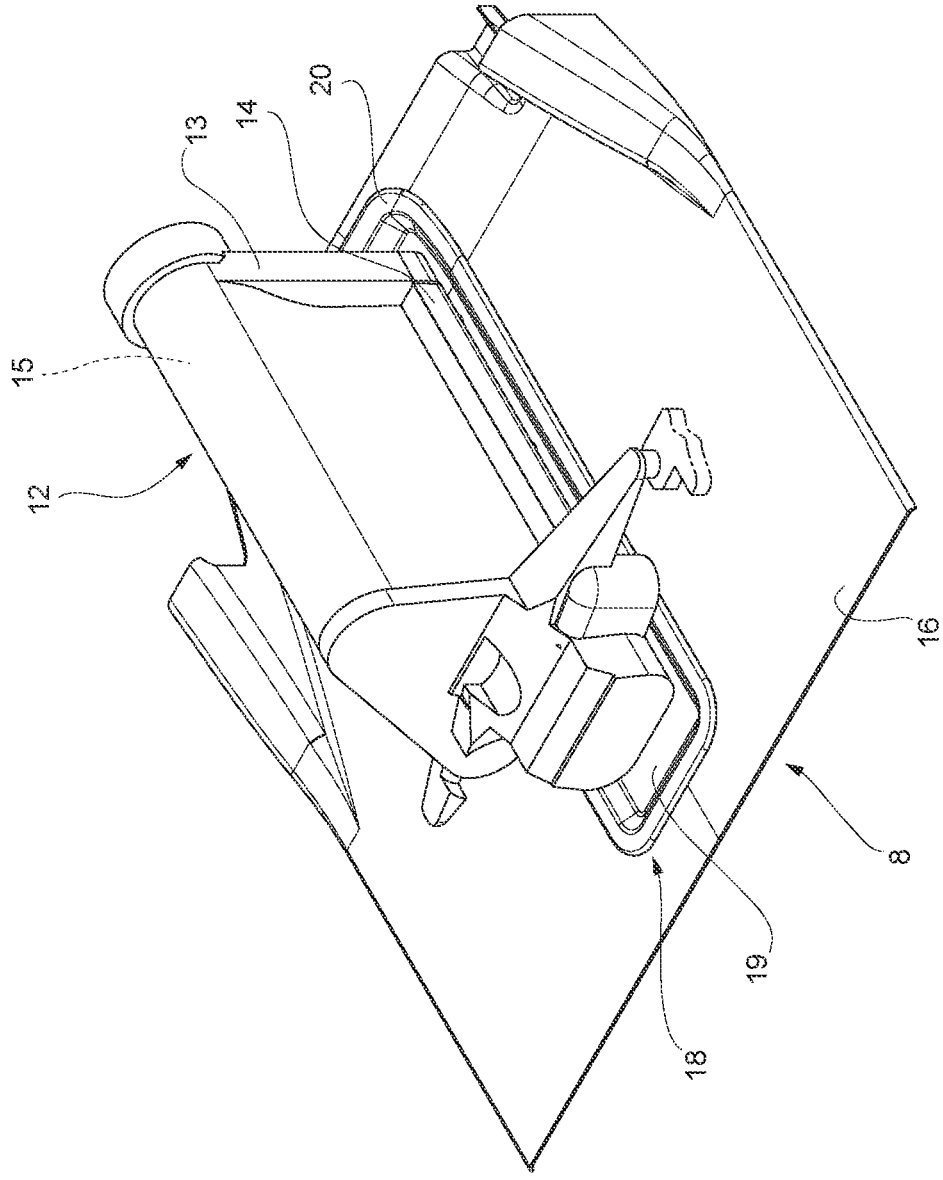
FIG. 3 is a schematic perspective view, with parts removed for greater clarity, of a detail of the car of FIG. 1.
Figure 4:
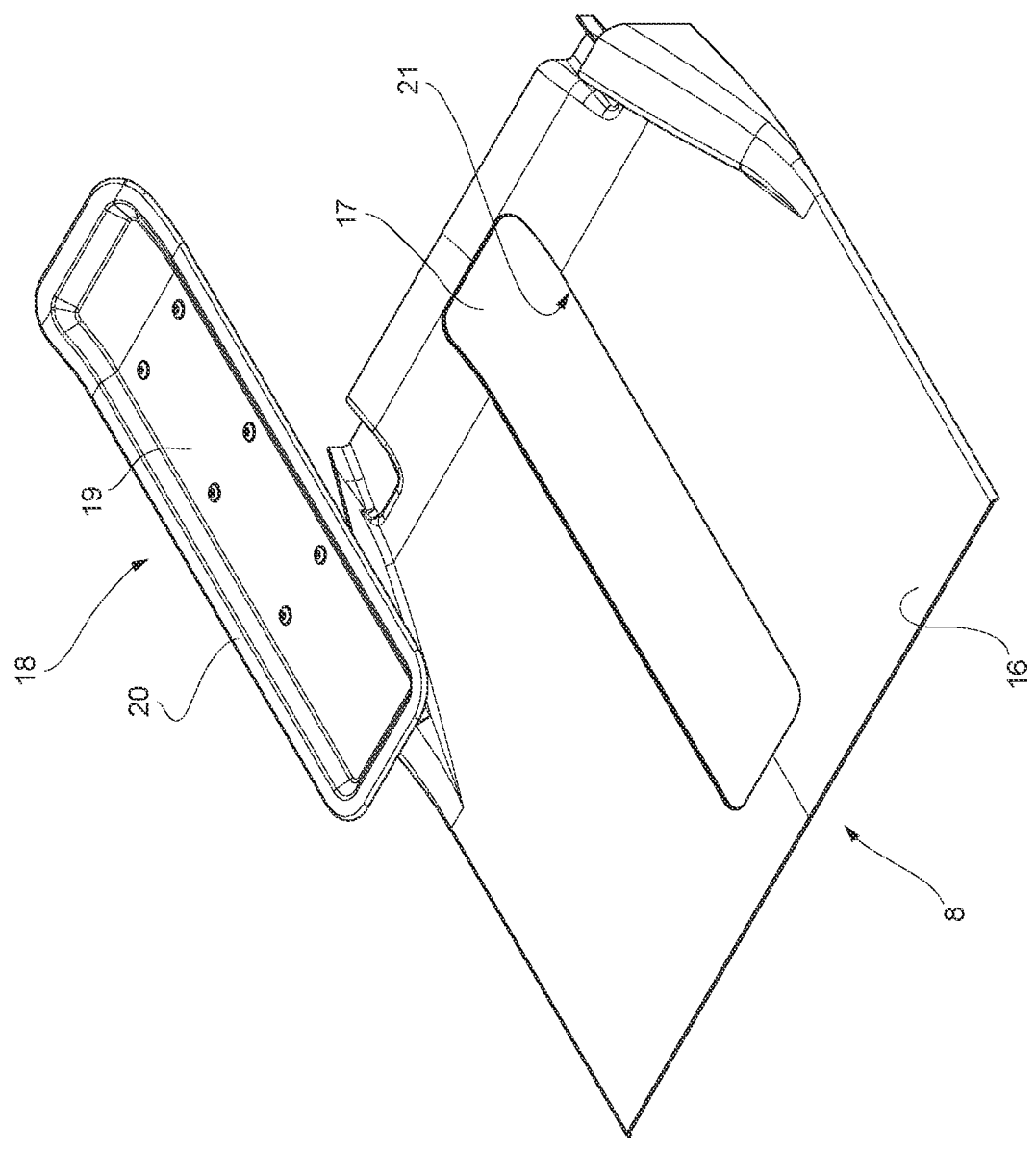
FIG. 4 is a schematic, exploded perspective view, with parts removed for greater clarity, of a detail of FIG. 3.
Figure 5:
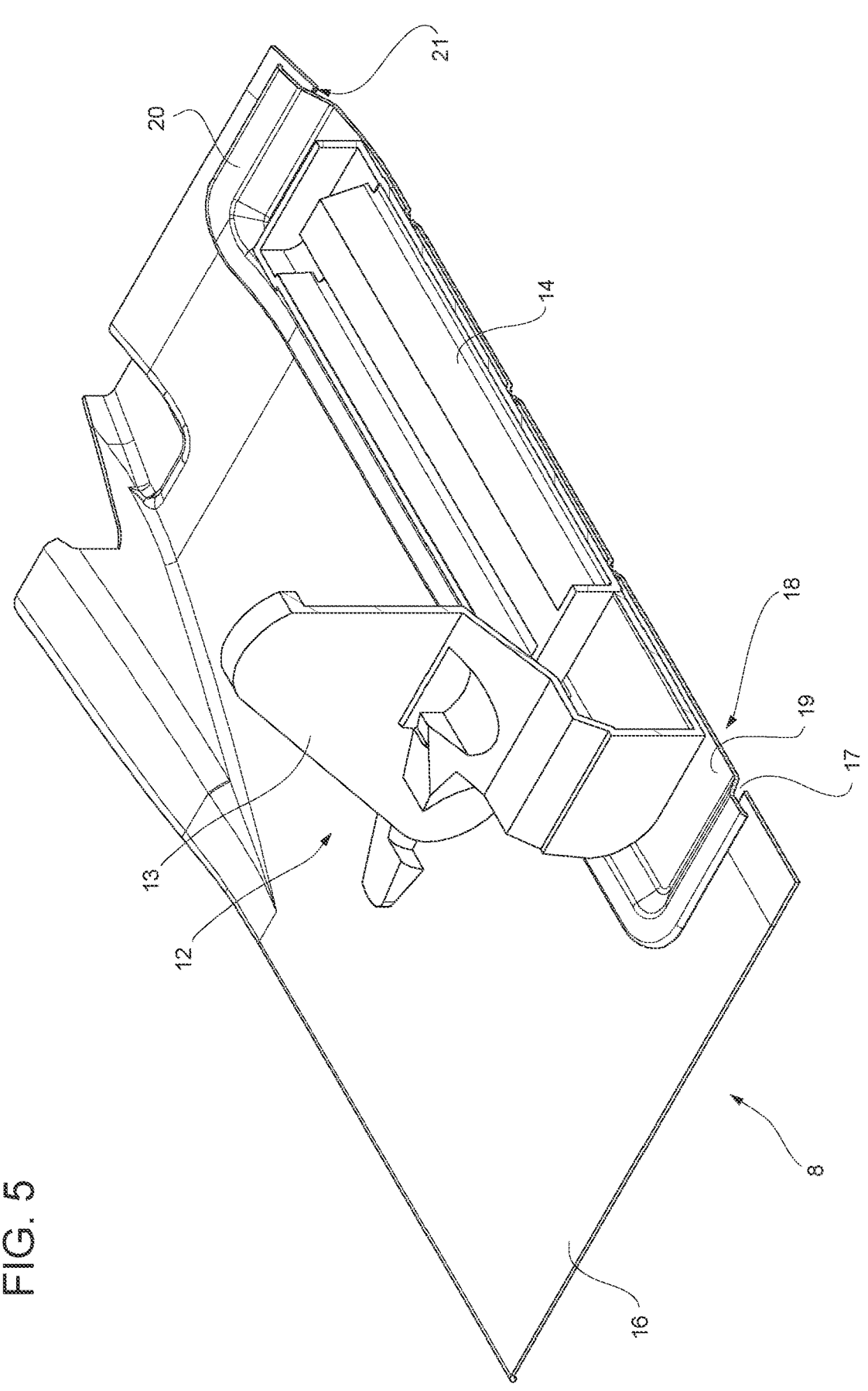
FIG. 5 is a schematic perspective view, with sectional parts and with parts removed for greater clarity, of the detail of FIG. 3.

According to FIGS. 3, 4 and 5, the car 1 further comprises a driving engine 12, which is mounted at the centre of the rear area 9 and is connected to the frame 2 through the interposition of a known elastic shock absorber device, which is not shown herein, so as to have at least one degree of freedom relative to the frame 2 during the normal operation of the car 1.

The engine 12 comprises a crankcase 13, a cylinder head 14 facing the floor 3 and a transmission shaft 15 and is oriented so that the cylinder head 14 is arranged under the shaft 15.

The rear bottom 8 comprises a fixed portion 16, which has an annular shape, is fixed to the frame 2 and is provided with a central opening 17 with a substantially rectangular shape, and a movable portion 18, which has the shape of a substantially rectangular tank and is fixed under the cylinder head 14.

Since the portion 18 is fixed to the cylinder head 14 and the engine 12 is connected to the frame 2 through the interposition of the aforesaid elastic shock absorber device (not shown), the assembly defined by the engine 12 and by the portion 18 is movable relative to the frame 2 during the normal operation of the car 1.

The portion 18 is delimited by a bottom wall 19, which is substantially coplanar to the portion 16, is fixed to the cylinder head 14 and is provided with an outer peripheral edge 20.

The edge 20 projects upwards from the wall 19, is bent on top of and along an inner peripheral edge 21 of the opening 17 and is arranged at a distance from the edge 21 so as to allow air to flow along the floor 3 and prevent air from penetrating between the edges 20 and 21.

Figure 6:
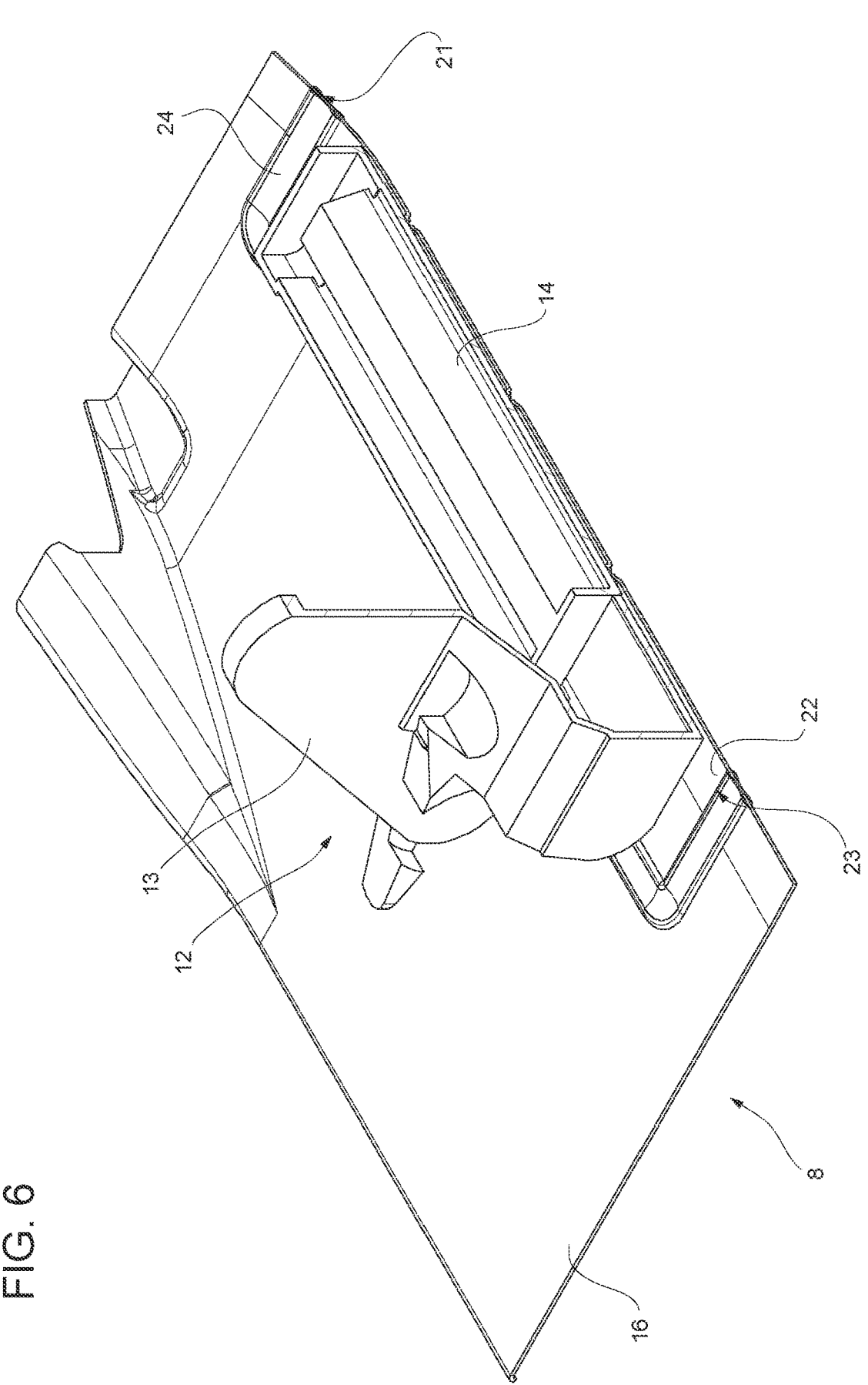
FIG. 6 is a schematic perspective view, with sectional parts and with parts removed for greater clarity, of a variant of the detail of FIG. 3.

The variant shown in FIG. 6 differs from FIGS. 3 and 5 only in that, in it, the movable portion 18 is eliminated and replaced by a movable portion 22, which has the shape of a substantially rectangular plate, extends inside the opening 17 and is substantially coplanar to the portion 16.

The portion 22 has an outer peripheral edge 23 connected to the edge 21 through the interposition of an annular gasket 24, which is made of an elastically deformable material and is coupled, on one side, to the edge 21 and, on the other side, to the edge 23.

The configuration of the rear bottom 8, namely the presence of the fixed portion 16 and of the movable portion 18 or 22, allows both the driving engine 12 and the centre of gravity of the car 1 to be lowered and, hence, ensures relatively high aerodynamics of the car 1.

The configuration of the outer peripheral edge 20 of the movable portion 18 and of the inner peripheral edge 21 of the opening 17 and the presence of the annular gasket 24 allow the fixed portion 16 and the movable portion 18 or 22 of the rear bottom 8 to be correctly joined to one another and, hence, ensure relatively high aerodynamics of the car 1.

The invention claimed is:

1. A car comprising:

a support frame (2) defining part of a lower floor (3) of the car;

a passenger compartment (4) projecting upwards from the lower floor (3);

a driving engine (12) to move the car; and an aerodynamic bottom (5) at least partly fixed to the support frame (2) and defining part of the lower floor (3); and characterized in that the aerodynamic bottom (5) comprises a fixed portion (16) locked on the support frame (2) and a movable portion (18; 22) locked on the driving engine (12) and movable relative to the fixed portion (16);

wherein the fixed portion (16) has an annular shape and extends around the movable portion (18; 22);

wherein the fixed portion (16) has an inner peripheral edge (21) and the movable portion (18; 22) has an outer peripheral edge (20; 23); and wherein the outer peripheral edge (20) of the movable portion (18) is bent upwards from a bottom wall (19) of the movable portion (18) and extends above and around the inner peripheral edge (21) of the fixed portion (16).

2. The car according to claim 1, wherein the driving engine (12) is mounted on the support frame (2) through the interposition of an elastic shock absorber device.

3. The car according to claim 1, wherein the aerodynamic bottom (5) further comprises an annular gasket (24), which is elastically deformable and is interposed between the outer peripheral edge (23) of the movable portion (22) and the inner peripheral edge (21) of the fixed portion (16).

4. The car according to claim 1, wherein the driving engine (12) is mounted at the centre of a rear zone (9) of the car.

5. The car according to claim 4, wherein the fixed portion (16) and the movable portion (18; 22) of the aerodynamic bottom (5) are mounted in the area of the rear zone (9) of the car.

6. The car according to claim 1, wherein the driving engine (12) comprises a cylinder head (14), a crankcase (13) and a drive shaft (15) extending above the cylinder head (14); the movable portion (18; 22) of the aerodynamic bottom (5) being fixed to the cylinder head (14) of the driving engine (12).

7. A car comprising:

a support frame (2) defining part of a lower floor (3) of the car;

a passenger compartment (4) projecting upwards from the lower floor (3);

a driving engine (12) to move the car; and an aerodynamic bottom (5) at least partly fixed to the support frame (2) and defining part of the lower floor (3); and characterized in that the aerodynamic bottom (5) comprises a fixed portion (16) locked on the support frame (2) and a movable portion (18; 22) locked on the driving engine (12) and movable relative to the fixed portion (16);

wherein the driving engine (12) comprises a cylinder head (14), a crankcase (13) and a drive shaft (15) extending above the cylinder head (14); the movable portion (18; 22) of the aerodynamic bottom (5) being fixed to the cylinder head (14) of the driving engine (12).

8. A car comprising:

a support frame (2) defining part of a lower floor (3) of the car;

a passenger compartment (4) projecting upwards from the lower floor (3);

a driving engine (12) to move the car; and an aerodynamic bottom (5) at least partly fixed to the support frame (2) and defining part of the lower floor (3); and characterized in that the aerodynamic bottom (5) comprises a fixed portion (16) locked on the support frame (2) and a movable portion (18; 22) locked on the driving engine (12) and movable relative to the fixed portion (16);

wherein the fixed portion (16) has an annular shape and extends around the movable portion (18; 22);

wherein the fixed portion (16) has an inner peripheral edge (21) and the movable portion (18; 22) has an outer peripheral edge (20; 23); and wherein the aerodynamic bottom (5) further comprises an annular gasket (24), which is elastically deformable and is interposed between the outer peripheral edge (23) of the movable portion (22) and the inner peripheral edge (21) of the fixed portion (16).

* * * * *